United States Patent [19]

Arnaud

[11] 4,370,847
[45] Feb. 1, 1983

[54] GRAPE HARVESTER

[75] Inventor: Claude B. Arnaud, Theize, France

[73] Assignee: Societe Anonyme Dite: Corneloup S.A., Lozanne, France

[21] Appl. No.: 310,342

[22] Filed: Oct. 9, 1981

[30] Foreign Application Priority Data

Oct. 10, 1980 [FR] France .................................. 80 22094

[51] Int. Cl.³ .................................................. A01D 46/00
[52] U.S. Cl. ................................................... 56/330
[58] Field of Search ............... 56/330, 328 TS, 328 R, 56/130, 126

[56] References Cited

U.S. PATENT DOCUMENTS 4,085,572 4/1978 Bruel .................................... 56/330

*Primary Examiner*—Jay N. Eskovitz
*Attorney, Agent, or Firm*—Karl F. Ross

[57] ABSTRACT

A grape harvesting apparatus has a portal-type chassis adapted to travel along the ground in a predetermined direction and having two vertical supports elongated in the direction and at least limitedly horizontally movable on the chassis. These supports normally flank an upright median plane extending in the chassis travel direction. Respective pluralities of vertically spaced and horizontally extending beater wires on the supports each have relative to the travel direction a front wire end attached to the respective support, a forward wire portion inclined inward and backward toward the plane, a rear wire portion generally parallel to the plane, and a rear wire end attached to the respective support behind the respective front end. A drive is provided on the chassis for synchronously and oppositely displacing the supports with the respective beater wires transverse to the travel direction while maintaining the supports generally parallel. Thus grapes will be shaken from grape vines between the beater wires.

10 Claims, 4 Drawing Figures

GRAPE HARVESTER

FIELD OF THE INVENTION

The present invention relates to a grape harvester. More particularly this invention concerns an automotive or trailer-type machine that rides along a row of grape vines and automatically strips the grapes from the vines.

BACKGROUND OF THE INVENTION

The standard grape-harvesting machine has a portal-type chassis that rides along the row of vines, straddling these vines. Such a machine normally is provided with flexible clubs that strike the bases of the vines to shake the vines so that the grapes drop off into catchments provided in the machine. Such an arrangement is particularly effective since the ripe grapes can be readily dislodged from the vines in this manner, but the unripe ones cannot be shaken loose so readily.

The main disadvantage with such an apparatus is that the clubs damage the trunk of the vine, occasionally killing the vine or at least injuring it. Furthermore such an arrangement is not effective on tall vines, since the blow delivered to the base of the vine is attenuated greatly by the time it is transmitted to the upper portions of the vine. This last-mentioned disadvantage therefore results in incomplete harvesting and wastage of the grapes.

OBJECTS OF THE INVENTION

It is therefore an object of the present invention to provide an improved grape-harvesting apparatus.

Another object is the provision of such a grape-harvesting apparatus which overcomes the above-given disadvantages.

SUMMARY OF THE INVENTION

These objects are attained according to the instant invention in a grape-harvesting apparatus comprising a portal-type chassis adapted to travel along the ground in a predetermined direction and having two vertical supports elongated in the direction and at least limitedly horizontally movable on the chassis. These supports normally flank an upright median plane extending in the chassis travel direction. Respective pluralities of vertically spaced and horizontally extending beater wires on the supports each have relative to the travel direction a front wire end attached to the respective support, a forward wire portion inclined inward and backward toward the plane, a rear wire portion generally parallel to the plane, and a rear wire end attached to the respective support behind the respective front end. Drive means is provided on the chassis for synchronously and oppositely displacing the supports with the respective beater wires transverse to the travel direction while maintaining the supports generally parallel. Thus grapes will be shaken from grape vines between the beater wires.

The system according to the instant invention will therefore be able to gently shake the vines themselves. This is done not by delivering a sharp hard blow to the trunk of the vine, but by actually physically engaging each vine with a plurality of spring-steel wires so as directly to shake the vines. Such a system has proven itself extremely efficient in completely stripping ripe grapes from a grape vine.

According to further features of the invention the supports have front and rear support ends and are each pivotal on the chassis at one of the respective support ends about a vertical axis. The drive means oscillates the supports about the respective vertical axes. The grape vines are therefore gently engaged in the forwardly open V-shaped throat formed between the two sets of beater wires and then shaken as the two sets of beater wires oscillate together synchronously.

In accordance with another feature of this invention each of the rear wire portions is spaced horizontally from the respective support by a distance equal approximately to half of the horizontal spacing between the supports, measured perpendicular to the plane and direction. The wires are flexible enough, however, to prevent crushing or damaging of the vines. This effect is enhanced when, according to the invention, the beater wires of one support are vertically staggered between and lie vertically offset from the beater wires of the other support.

In accordance with another feature of the invention, each of the supports is further provided underneath the respective beater wires with a lowermost beater wire pivotal about a horizontal axis downward from a horizontal position. Each such support has means including a counterweight urging the respective lowermost beater wire upward into the horizontal position. In this manner the vine is effectively engaged from top to bottom, but the critical lower beater wire can be deflected laterally if necessary to prevent damaging the vine since most vines are of irregular shape at this lower trunk area. In addition these lowermost beater wires are only attached at their leading or front ends to further prevent them from damaging the vines.

The apparatus according to this invention further comprises two additional such supports on the chassis behind the first two mentioned supports and provided with respective such beater wires and connected to the drive means. The additional supports are pivoted about the respective vertical axes on the chassis at the respective rear support ends and the first two mentioned supports are pivoted about the respective vertical axes on the chassis at the respective front support ends.

The apparatus may also comprise for each support an upright tubular support arm having an upper arm end pivoted on the chassis about the respective horizontal axis and a lower arm end. The drive means includes respective shafts extending vertically through the arms and having lower ends provided with eccentric cranks in turn provided with links connected to the respective supports at the respective other ends. In addition each of the arms is provided at its lower arm end with a weight and is provided with a spring engaged between the arm and the chassis and urging the respective arm inward toward the plane. The drive means includes a motor on the chassis connected to the shafts at the upper arm ends. In this manner accurate synchronous movement of the two supports is ensured, that is if one moves to one side the other one moves in the same direction to prevent excessive pinching of any of the vines.

Each of the supports may, according to the invention, have above the respective horizontal axis an upward extension. The apparatus further has a flexible but inextensible element connected between the extensions, extending perpendicular to the plane, and normally under tension. This element, which is normally a cable or chain, prevents the lower ends of the arms and the supports from moving too closely together.

DESCRIPTION OF THE DRAWING

The above and other features and advantages will become more readily apparent from the following, reference being made to the accompanying drawing in which.

SPECIFIC DESCRIPTION

Figure 1:
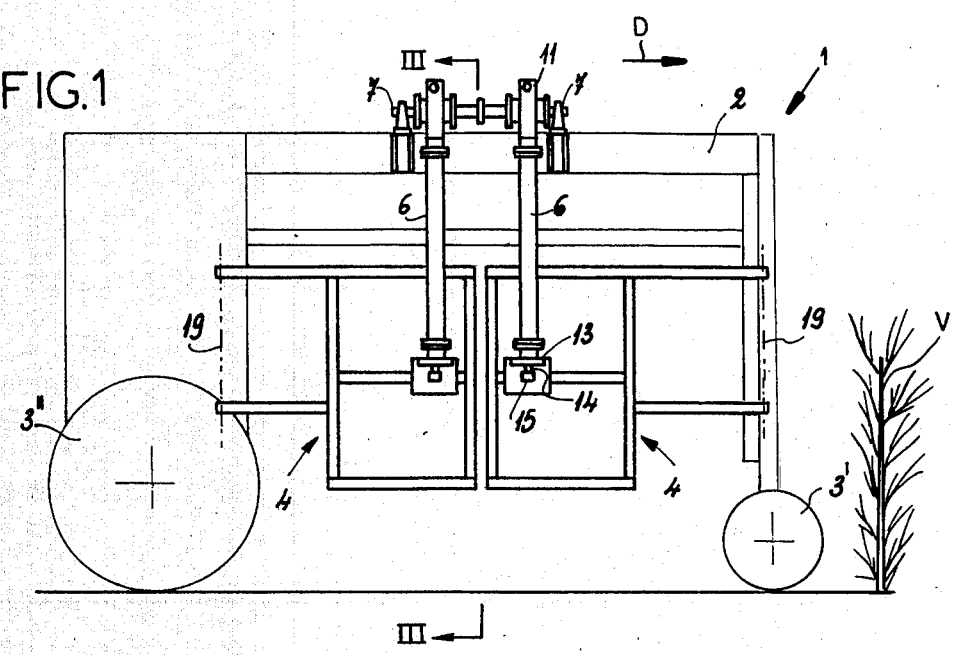
FIG. 1 is a side view of the harvester according to this invention.
Figure 2:
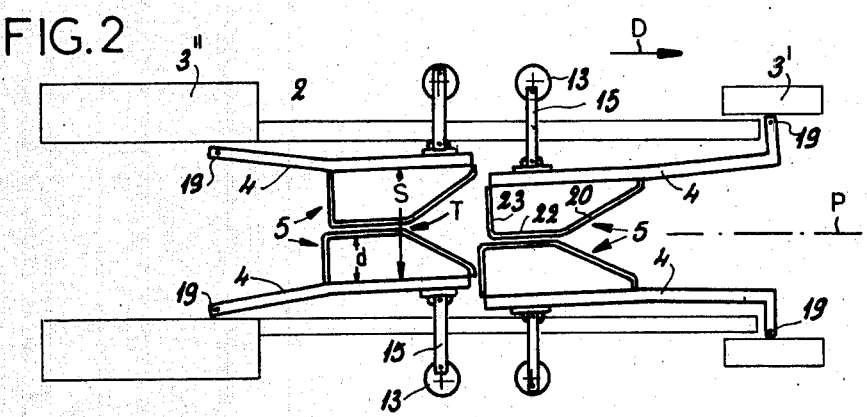
FIG. 2 is a top view of the apparatus of FIG. 1.

As seen in FIGS. 1 and 2 a grape harvester 1 has a portal-type chassis 2 that can move along the ground in a direction D by means of steerable front wheels 3' and driven rear wheels 3''. This chassis 2 is generally symmetrical about a central plane P extending in the direction D and is intended to move along rows of vines V, straddling these vines V.

The chassis 2 supports four similar supports 4 each carrying a plurality of identical beater wires 5 made of spring steel. The front two supports 4, to the right in FIGS. 1 and 2, are pivoted at their front ends at upright axes 19 adjacent the front wheels 3' and the rear two supports 4 are pivoted at their rear ends at upright axes 19 adjacent the rear wheels 3''.

Depending from each side of the chassis 2 outside each support 4 is a tubular support arm 6 pivoted at its upper end about a horizontal axle 7 and provided internally with a shaft 8. A motor 9 on the top center of the chassis 2 is connected via chains 10 to the shafts 7 which in turn are connected via bevel gears 12 to the upper ends of these shafts 8. This arrangement allows the arms to pivot limitedly about the axles 7. In addition the lower end of each of the shafts 8 is provided with a disk 13 having an eccentric crank 14 connected via a link 15 to a pivot plate 16 on the respective support 4. The lower ends of the arms 6 are provided with weights 17 and tension springs 18 are hooked between the chassis 2 and the inside middles of these arms 6 to maintain them in the illustrated vertical positions. The upper ends of the arms 6 are each provided with an extension 11 which is connected to the opposite extension 11 by means of a flexible but inextensible element 24, here a cable. Thus the lower ends of the arms 6 cannot move together further than is illustrated.

Figure 4:
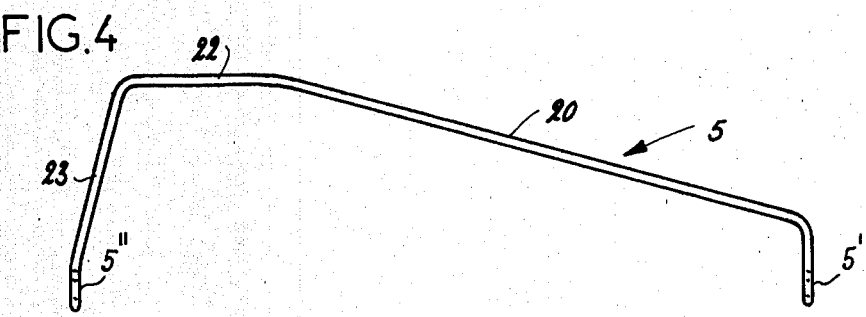
FIG. 4 is a large-scale top view of a beater wire according to the invention.

Each of the wires 5 has as shown in FIGS. 2 and 4 a front end 5' and a rear end 5'' formed as eyes to facilitate mounting on the respective support 4. In addition each wire has, relative to the direction D, a long front portion 20 which is inclined backward and inward at an angle of about 15°, a short central portion 22 parallel to this direction, and a rear portion 23 generally perpendicular to it, here extending back from the portion 22 at an angle of about 75°. These wires 65 are made of flexible but strong spring steel for long service lives and low cost. The transverse dimension d of each wire, measured between its middle portion 22 and the respective support 4, is equal to slightly less than half of the transverse spacing S between confronting supports 4 as shown in FIG. 2. Thus the wires form a narrow throat T for the vines V.

At the lower end of each of the supports 4 is a lowermost beater wire 25 mounted only at its front end at a horizontal pivot 26 and extending outward to a counterweight 27 that urges it into the illustrated position. If an irregularly shaped vine stem strikes these lowermost beater wires 25 they will therefore be able to pivot downward out of the way to avoid damage to the vines.

Underneath the beater wires 5 are two elastomeric flaps 28 that extend downward and outward to conveyors 30 from which catchment plates 29 extend outward and upward. Any grapes shaken loose by the apparatus will therefore land on the flaps 28 or plates 29 and will roll down to the conveyors 30 whence they are delivered to an appropriate hopper on the chassis 2.

Figure 3:
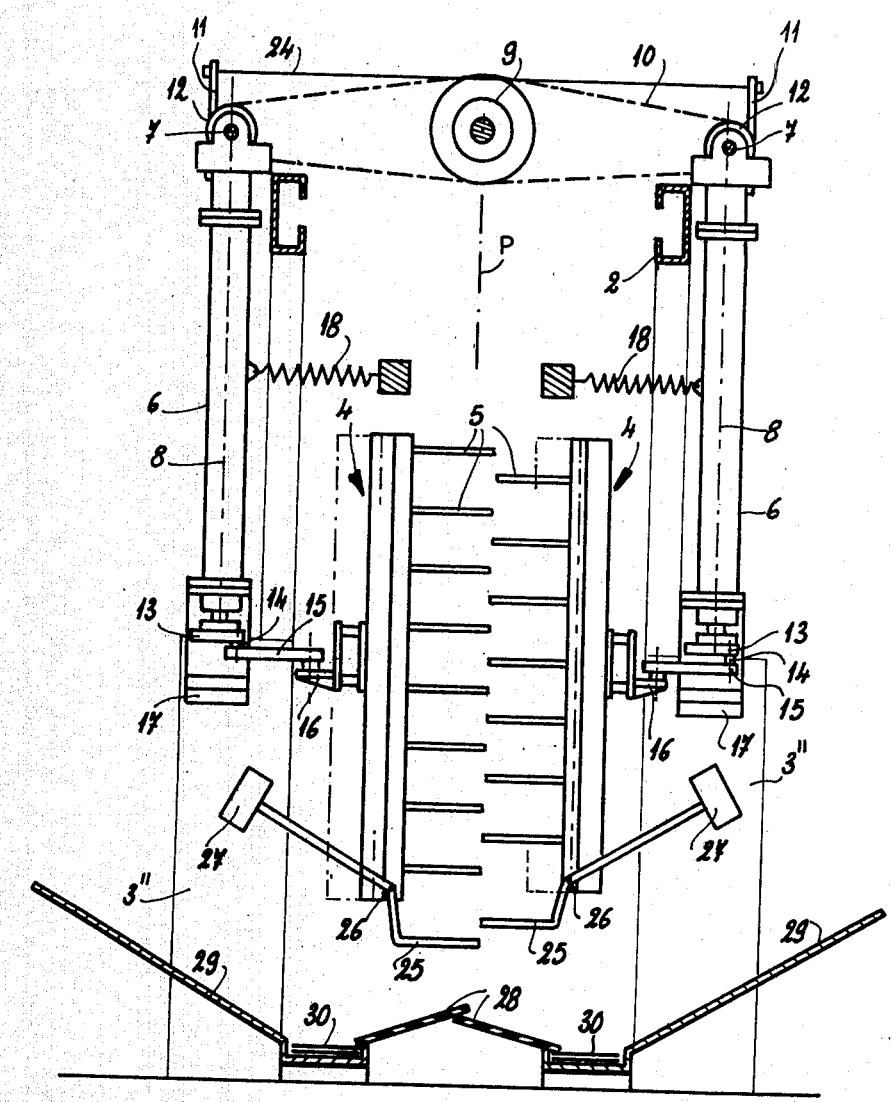
FIG. 3 is a section taken along line III—III of FIG. 1.

In use the machine 1 moves along the row of vines V in the direction D, so that each such vine is engaged in the fowwardly V-shaped mouth formed by the front portions 20 of the wires 5. Meanwhile the motor 9 is oscillating the supports 4 with their beaters 5 about the respective axes 19. Each support 4 is moved synchronously with its confronting support 4, so that they move as seen in FIG. 3 from the solid-line to the dot-dash-line position together. The rear two supports 4 move oppositely to the front two supports 4 to cancel out any throw this movement would impart to the chassis 2.

The vines engaged between the beaters 5 are therefore shaken gently but firmly. Any ripe grapes on these vines will therefore be shaken loose to fall down and be caught by the conveyors 30. Since the beater wires 5 are open, the falling grapes can easily drop through them down in the machine. It has been found that the harvester according to the instant invention can harvest grapes mechanically with a higher degree of efficiency, that is in percentage of harvestable grapes recovered, than any prior-art machine, while subjecting the vines to less physical abuse.

I claim:

1. A grape-harvesting apparatus comprising:
    a portal-type chassis adapted to travel along the ground in a predetermined direction;
    two vertical supports on said chassis elongated in said direction and at least limitedly horizontally movable on said chassis, said supports normally flanking an upright median plane extending in said direction;
    respective pluralities of vertically spaced and horizontally extending beater wires on said supports, each wire having relative to said direction
    a front wire end attached to the respective support,
    a forward wire portion inclined inwardly and backwardly toward said plane,
    a rear wire portion generally parallel to said plane, and
    a rear wire end attached to the respective support behind the respective front end;
    drive means on said chassis for synchronously and oppositely displacing said supports with the respective beater wires transverse to said direction while maintaining said supports generally parallel, whereby grapes will be shaken from grape vines between said beater wires.

2. The apparatus defined in claim 1 wherein said supports have front and rear support ends and are each pivotal on said chassis at one of the respective support ends about a vertical axis, said drive means oscillating said supports about the respective vertical axes.

3. The apparatus defined in claim 2 wherein each of said rear wire portions is spaced horizontally from the respective support by a distance equal approximately to half of the horizontal spacing between said supports, measured perpendicular to said plane and direction.

4. The apparatus defined in claim 2 wherein the beater wires of one support are vertically staggered between and lie vertically offset from the beater wires of the other support.

5. The apparatus defined in claim 2 wherein each of said supports is further provided underneath the respective beater wires with a lowermost beater wire pivotal about a horizontal axis downwardly from a horizontal position, each support having means including a counterweight urging the respective lowermost beater wire upward into said horizontal position.

6. The apparatus defined in claim 2, further comprising two additional such supports on said chassis behind the first two mentioned supports and provided with respective such beater wires and connected to said drive means, said additional supports being pivoted about the respective vertical axes on said chassis at the respective rear support ends and the first two mentioned supports being pivoted about the respective vertical axes on said chassis at the respective front support ends.

7. The apparatus defined in claim 2, further comprising for each support an upright tubular support arm having an upper arm end pivoted on said chassis about the respective horizontal axis and a lower arm end, said drive means including respective shafts extending vertically through said arms and having lower ends provided with eccentric cranks in turn provided with links connected to the respective supports at the respective other ends.

8. The apparatus defined in claim 7 wherein each of said arms is provided at its lower arm end with a weight and is provided with a spring engaged between said arm and said chassis and urging the respective arm inwardly toward said plane.

9. The apparatus defined in claim 7 wherein said drive means includes a motor on said chassis connected to said shafts at said upper arm ends.

10. The apparatus defined in claim 2 wherein each of said supports has above the respective horizontal axis an upward extension, said apparatus further comprising a flexible but inextensible element connected between said extensions, extending perpendicular to said plane, and normally under tension.

* * * * *